United States Patent
Aida et al.

(10) Patent No.: US 9,142,252 B2
(45) Date of Patent: Sep. 22, 2015

(54) MAGNETIC DISK DRIVE AND DATA REWRITE METHODS

(75) Inventors: Toru Aida, Yamato (JP); Shuhsuke Kurihara, Yokohama (JP); Toshihiko Tsunokawa, Yokohama (JP); Hideaki Maeda, Yokohama (JP)

(73) Assignee: HGST Netherlands B.V., Amsterdam (NL)

( * ) Notice: Subject to any disclaimer, the term of this patent is extended or adjusted under 35 U.S.C. 154(b) by 1032 days.

(21) Appl. No.: 12/822,130

(22) Filed: Jun. 23, 2010

(65) Prior Publication Data

US 2010/0321817 A1    Dec. 23, 2010

(30) Foreign Application Priority Data

Jun. 23, 2009  (JP) ................. 2009-149230

(51) Int. Cl.
  *G11B 5/09*  (2006.01)
  *G11B 5/02*  (2006.01)
  *G11B 20/18*  (2006.01)

(52) U.S. Cl.
  CPC  *G11B 20/18* (2013.01); *G11B 5/09* (2013.01); *G11B 2020/1869* (2013.01); *G11B 2220/2516* (2013.01)

(58) Field of Classification Search
  None
  See application file for complete search history.

(56) References Cited

U.S. PATENT DOCUMENTS

| | | | |
|---|---|---|---|
| 6,384,999 B1* | 5/2002 | Schibilla | 360/53 |
| 7,024,614 B1* | 4/2006 | Thelin et al. | 714/770 |
| 7,345,837 B1* | 3/2008 | Schreck et al. | 360/31 |
| 7,379,256 B2* | 5/2008 | McMurtrey | 360/53 |
| 7,649,704 B1* | 1/2010 | Bombet et al. | 360/31 |
| 7,672,072 B1* | 3/2010 | Boyle et al. | 360/31 |
| 7,738,208 B2* | 6/2010 | Kim et al. | 360/60 |
| 7,872,822 B1* | 1/2011 | Rothberg | 360/31 |
| 7,880,988 B2* | 2/2011 | Ahn | 360/31 |
| 7,880,994 B2* | 2/2011 | Sato | 360/53 |
| 2004/0268033 A1* | 12/2004 | Chia et al. | 711/112 |
| 2005/0180267 A1* | 8/2005 | Jeong et al. | 368/96 |
| 2007/0072012 A1 | 3/2007 | Nakamura et al. | 428/831.2 |
| 2007/0153419 A1 | 7/2007 | Arai et al. | 360/131 |
| 2008/0239901 A1 | 10/2008 | Tsunokawa et al. | 369/53.15 |

FOREIGN PATENT DOCUMENTS

| | | | |
|---|---|---|---|
| JP | 2005/004869 | 1/2005 | G11B 20/18 |
| JP | 2005-267702 A | 9/2005 | |
| JP | 2008/243269 | 10/2008 | G11B 20/18 |
| WO | 2009040929 A1 | 4/2009 | |

* cited by examiner

*Primary Examiner* — K. Wong
(74) *Attorney, Agent, or Firm* — Zilka-Kotab, PC (57) ABSTRACT

In one embodiment, a magnetic disk drive includes a magnetic disk having data tracks, a magnetic head, a motion mechanism for moving the magnetic head, and a controller. The controller adds a value to a rewrite parameter for a rewrite region based on a number of writes to data tracks related to the rewrite region, the value is chosen to reflect a degree of influence the number of writes have on the rewrite region, and the magnetic head rewrites data of the rewrite region when the rewrite parameter is greater than a threshold. In another embodiment, a method includes writing data tracks in a rewrite region, defining values reflecting a degree(s) of influence on the rewrite region, adding the values to a rewrite parameter upon writing data to the data tracks, determining that the rewrite parameter has reached or exceeded a threshold and rewriting data in the rewrite region.

22 Claims, 7 Drawing Sheets

Figure 1

17 temperature sensor
21 RW channel
22 motor driver unit
51 host

Weight Table
Head Slider 0

|  | Inner circumferential range | Center circumferential range | Outer circumferential range |
|---|---|---|---|
| Low temperature range | X1_0 | Y1_0 | Z1_0 |
| Intermediate temperature range | X2_0 | Y2_0 | Z2_0 |
| High temperature range | X3_0 | Y3_0 | Z3_0 |

Weight Table
Head Slider 1

|  | Inner circumferential range | Center circumferential range | Outer circumferential range |
|---|---|---|---|
| Low temperature range | X1_1 | Y1_1 | Z1_1 |
| Intermediate temperature range | X2_1 | Y2_1 | Z2_1 |
| High temperature range | X3_1 | Y3_1 | Z3_1 |

A     rewrite region
B     first section
C     second section
D     counter value
E     counter clear

Figure 6

Weight Tables

First Section

|  | Inner circumferential range | Center circumferential range | Outer circumferential range |
|---|---|---|---|
| Low temperature range | X1_A | Y1_A | Z1_A |
| Intermediate temperature range | X2_A | Y2_A | Z2_A |
| High temperature range | X3_A | Y3_A | Z3_A |

Second Section

|  | Inner circumferential range | Center circumferential range | Outer circumferential range |
|---|---|---|---|
| Low temperature range | X1_B | Y1_B | Z1_B |
| Intermediate temperature range | X2_B | Y2_B | Z2_B |
| High temperature range | X3_B | Y3_B | Z3_B |

Figure 7

MAGNETIC DISK DRIVE AND DATA REWRITE METHODS

RELATED APPLICATIONS

The present application claims priority to a Japanese Patent Application filed Jun. 23, 2009, under Appl. No. 2009-149230, which is incorporated herein by reference.

FIELD OF THE INVENTION

The present invention relates to a magnetic disk drive and a data rewrite method, and more particularly, to the protection of magnetic data during repeated writes.

BACKGROUND OF THE INVENTION

Devices using various types of disks, such as optical disks, optomagnetic disks, flexible magnetic disks, etc., are known as disk drives. Of these, a hard disk drive (HDD), which is a magnetic disk drive, is used in many electronic devices, such as video recording and playback devices, car navigation systems, personal music devices, in addition to computer systems.

A magnetic disk used in an HDD has a plurality of data tracks and a plurality of servo tracks formed in concentric circular shapes. Each servo track is comprised of a plurality servo sectors containing address information. in addition, each data track is comprised of a plurality of data sectors which may include user data. The data sectors are recorded between the servo sectors, which are separated in the circumferential direction. A head element of a head slider supported by an oscillating actuator can write data to the data sectors and read out data from the data sectors by accessing the desired data sector in accordance with the address information in the servo sectors.

An HDD repeatedly writes and reads data on the recording surface of a magnetic disk. As a result of higher density magnetic recording in the past few years, the leakage magnetic field from the head slider during a data write to the selected data track is known to affect the magnetic data in the adjacent tracks. In addition, repeated magnetization changes in a data track are known to affect the magnetization of the adjacent data tracks. Therefore, when data are repeatedly written to a data track, the interference with the adjacent data tracks occurs repeatedly due to the leakage of the magnetic field from the head slider and the magnetization changes of the data track, which causes the data in the adjacent data tracks to change, and data losses (read hard errors) may occur.

To prevent this type of read hard error, a proposal in Japanese Unexamined Patent Application Pub. No. 2008-243269 is a technique which counts the number of writes to a data track and rewrites the data in the adjacent tracks when the write count reaches a threshold. This technique counts the number of writes to a plurality of tracks formed into a group, and rewrites the group and the adjacent tracks to the group when the count reaches a threshold. Thus, by counting the writes to the group, the memory region for storing the number of writes can be reduced. Furthermore, by rewriting the adjacent tracks of the group in addition to the group, read hard errors can be more reliably prevented.

In the technique disclosed in Japanese Unexamined Patent Application Pub. No. 2005-004869, thresholds are set for the values of the date of the last update of the data track, the number of updates to the adjacent data tracks, the number of reads, etc. When these values exceed the thresholds, the data tracks are rewritten. Furthermore, this reference discloses that the thresholds are changed by the temperature history, the operation history, and the error rate.

Simultaneously to the functions described above, however, the write count, which becomes the basis for rewriting the data tracks, also decreases as the data recording density increases. For example, a conventional HDD rewrites the data every 100,000 writes, but modern HDDs must rewrite the data every 50,000 writes in order to avoid degradation of the data. In addition, the number of data tracks which must be rewritten increases with the increase in the data recording density.

The data rewrites affect the HDD performance. The increase in the frequency of the starting of the above function due to the increase in the data recording density can no longer neglect the negative effect on the performance, e.g., the number of rewrites on modern HDDs is degrading their performance. Furthermore, the increase in the number of data tracks to be rewritten further increases the negative effect on the performance when performing current rewriting schemes.

Consequently, a technique is desired which can avoid the loss of data in the other data tracks caused by data writes to a data track while suppressing deterioration in the performance of the HDD.

SUMMARY OF THE INVENTION

A magnetic disk drive, in one embodiment, includes a magnetic disk having a plurality of data tracks, a magnetic head for accessing the magnetic disk, a motion mechanism for moving the magnetic head in a radial direction above the magnetic disk, and a controller electronically coupled to the magnetic head. The controller adds a value to a rewrite parameter for a rewrite region based on a number of writes to one or more of the plurality of data tracks related to the rewrite region, the value is chosen from a plurality of values which reflect a degree of influence the number of writes have on the rewrite region, and the magnetic head rewrites data of the rewrite region when the rewrite parameter is greater than a threshold.

In another embodiment, a method for rewriting data on a magnetic disk in a magnetic disk drive includes writing one or more of a plurality of data tracks in a rewrite region; defining a plurality of values, each value reflecting a degree of influence the writing the one or more of a plurality of data tracks has on the rewrite region; adding one of the plurality of values to a rewrite parameter for the rewrite region upon the writing data to one or more of the plurality of data tracks; determining that the rewrite parameter for the rewrite region has reached or exceeded a threshold; and rewriting data in the rewrite region when the rewrite parameter is greater than or equal to the threshold.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

Continuous writes to the same data track affect the magnetization states of the adjacent data tracks, and the data in the data tracks may be degraded or lost. To prevent this, as disclosed previously, a function may be implemented in an HDD to count the number of data writes to a data track or a track bundle composed of a plurality of data tracks and rewrite nearby data tracks when the specified count is reached.

Accompanying the increase in the data recording density, the above function is becoming very useful in an HDD. Simultaneously, however, the write count, which becomes the basis for rewriting the data tracks, also decreases as the data recording density increases. For example, a conventional HDD rewrites the data every 100,000 writes, but modern HDDs must rewrite the data every 50,000 writes or else face degradation. In addition, the number of data tracks which are rewritten increases with the increase in the data recording density.

A magnetic disk drive, in one general embodiment, includes a magnetic disk having a plurality of data tracks, a magnetic head for accessing the magnetic disk, a motion mechanism for moving the magnetic head in a radial direction above the magnetic disk, and a controller electronically coupled to the magnetic head. The controller adds a value to a rewrite parameter for a rewrite region based on a number of writes to one or more of the plurality of data tracks related to the rewrite region, the value is chosen from a plurality of values which reflect a degree of influence the number of writes have on the rewrite region, and the magnetic head rewrites data of the rewrite region when the rewrite parameter is greater than a threshold.

Preferably, the values are defined in response to the conditions when writing to one or more of a plurality of tracks. Thus, the rewrite period can be determined more appropriately. Furthermore, the write conditions preferably include the temperature during a write. Therefore, the rewrite period can be determined more appropriately.

In a preferred structure, the values vary in response to the radial position of the track on the magnetic disk. The rewrite period can be more appropriately determined depending on the radial position.

In a preferred structure, a plurality of heads is mounted, and values are defined for each of the plurality of heads. Thus, the rewrite period can be determined more appropriately for each head.

In a preferred structure, the rewrite region is comprised of a plurality of sections. Values are defined for each of the plurality of sections. Thus, the rewrite period can be determined more appropriately depending on the section in the rewrite region. Furthermore, preferably, the rewrite region comprises two sections. One section includes regions which are further from one or more of the plurality of tracks than the other section. Thus, the rewrite period can be determined more appropriately depending on the position of the section. More preferably, the controller calculates a common rewrite parameter for the two sections, and uses a different threshold for rewriting each of the two sections. Thus, the process can be conducted by using a simpler structure.

In a preferred structure, the controller updates the definitions of the values. Thus, the rewrite period can be determined more appropriately depending on state changes. More preferably, the controller uses an error rate in the rewrite region and determines whether to update the definition of the values. The error rate is an ideal parameter for indicating the state of the rewrite region.

In another general embodiment, a method for rewriting data on a magnetic disk in a magnetic disk drive includes writing one or more of a plurality of data tracks in a rewrite region; defining a plurality of values, each value reflecting a degree of influence the writing the one or more of a plurality of data tracks has on the rewrite region; adding one of the plurality of values to a rewrite parameter for the rewrite region upon the writing data to one or more of the plurality of data tracks; determining that the rewrite parameter for the rewrite region has reached or exceeded a threshold; and rewriting data in the rewrite region when the rewrite parameter is greater than or equal to the threshold.

According to one embodiment, data losses in the other data tracks caused by data writes to a data track can be prevented while suppressing deterioration in the performance of the magnetic disk drive.

Various embodiments are described below. To clarify, the descriptions and drawings below are appropriately omitted and simplified. In each drawing, the same reference number is assigned to the same element. To clarify the description, duplicate descriptions are omitted as needed. Below, an embodiment is described for a hard disk drive (HDD), which is an example of a magnetic disk drive.

This embodiment features a technique for avoiding data losses caused by the effects of a data write on adjacent data tracks. The HDD of this embodiment adds the values which reflect the degree of influence of a data write to a data track on adjacent data tracks to a rewrite parameter. When the rewrite parameter reaches a designated threshold, the HDD rewrites the adjacent data tracks. The degree of influence of the data write on adjacent data tracks differs depending on the head slider, the radial position of the data track on the magnetic disk to be written, the conditions during a data write, and the positional relationship between the data track to be written and the affected adjacent data tracks.

The frequency of rewrites to adjacent data tracks can be within an appropriate range while losses in the adjacent data tracks are prevented by rewriting the data based on the degree of influence of a data write on the adjacent data tracks, and not having the number of writes to the data track as the basis for the rewrites to adjacent data tracks. Before a data rewrite is described in detail for this embodiment, first, the entire structure of the HDD is described.

Figure 1:
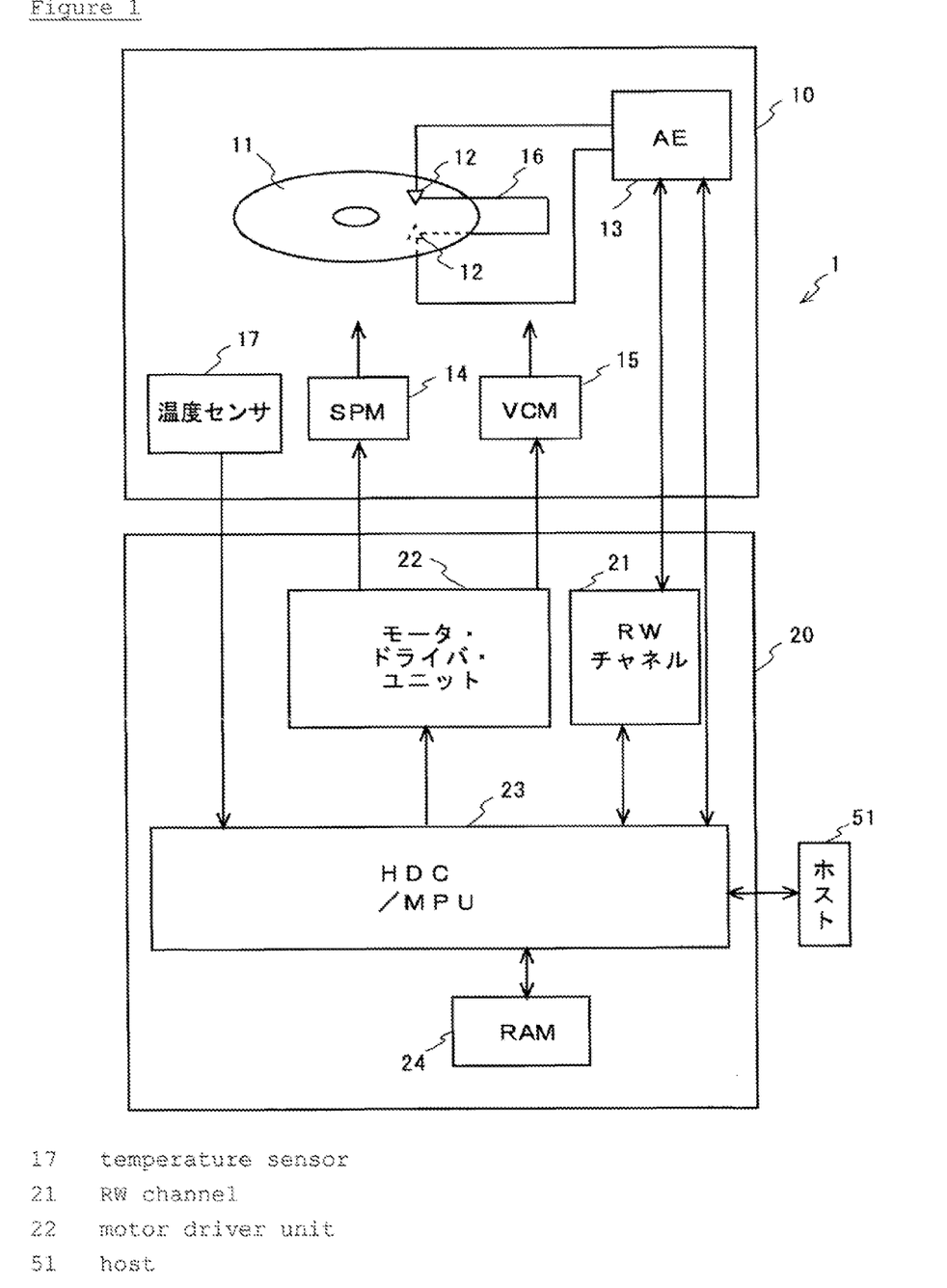
FIG. 1 is a block diagram schematically showing the entire structure of an HDD according to one embodiment.

FIG. 1 is a block diagram schematically showing an entire structure of an HDD 1. A read/write channel (RW channel) 21, a motor driver unit 22, and each circuit such as an integrated circuit (HDC/MPU) 23 of a hard disk controller (HDC) and an MPU and a semiconductor memory RAM 24 are mounted on a circuit board 20 fixed to the outside of an enclosure 10. Each circuit is implemented in one or a plurality of chips. A temperature sensor 17 is installed in the enclosure 10.

A spindle motor (SPM) 14 in the enclosure 10 rotates a magnetic disk 11, which is the disk storing data, at the designated angular velocity. A head slider 12, which is the head, has a slider flying above the magnetic disk 11 and a head element which is formed on the slider and converts magnetic signals and electrical signals (data read and write). The head slider 12 is fixed to the tip of an actuator 16.

The actuator 16 is connected to a voice coil motor (VCM) 15 and moves the head slider 12 in the radial direction above the rotating magnetic disk 11 by an oscillating motion with the oscillating axis at the center. The actuator 16 and the VCM 15 are the motion mechanism of the head slider 12. A motor driver unit 22 drives the SPM 14 and the VCM 15 in accordance with control data from the HDC/MPU 23.

An arm electronics (AE) circuit 13 selects the head slider 12 for accessing (reading or writing) the magnetic disk 11 from a plurality of head sliders 12 in accordance with control data from the HDC/MPU 23 and amplifies the read/write signal. During a read process, an RW channel 21 extracts servo data and user data from the read signal acquired from the AE 13 and decodes the data. The decoded data are supplied to the HDC/MPU 23. In addition, during a write process, the RW channel 21 code converts the write data supplied from the HDC/MPU 23, and converts the code-converted data to a write signal and supplies the signal to the AE 13.

In the HDC/MPU 23, the HDC is a digital circuit having various functions, and the MPU operates in accordance with firmware. Accompanying the start of the HDD 1, the data (including programs) required in the control and data processes are loaded into a RAM 24 from the magnetic disk 11 or a ROM (not shown).

The HDC/MPU 23 temporarily stores the read data from the magnetic disk 11 acquired through the RW channel 21 in a buffer of the RAM 24, and then sends the data to a host 51. In addition, the HDC/MPU 23 temporarily stores the write data from the host 51 in a buffer in the RAM 24, and then sends the data in the RW channel 21 at the designated timing. The HDC/MPU 23 is an example of a controller and controls the entire HDD 1 in addition to head positioning control, interface control, and other necessary processes related to data processing such as defect management. The HDC/MPU 23 references the detected temperature of a temperature sensor 17 as needed in these processes. The HDC/MPU 23 in this embodiment, in particular, rewrites the data.

The HDD 1 has several preferred structures (methods) for rewriting the user data in the affected regions. Each preferred structure is described in order below. In each of the following structures, different values are defined (e.g., predefined, calculated or otherwise determined, retrieved from a table, etc.) to reflect the degree of influence of the data write. By defining different values, HDD 1 can effectively prevent losses in adjacent data tracks caused by a data write while suppressing a drop in performance.

The HDC/MPU 23 backs up existing data for a data rewrite. Specifically, the HDC/MPU 23 reads the data to be rewritten by the head slider 12 and writes that data to another specified data track. Later, the same data are written again in the data sector which was read by the head slider 12. In the data rewrite, preferably, one entire data track is rewritten in one process. However, only the data sectors in a section of a data track may be rewritten in one process. These points are the same in the other structures below.

Figure 2:
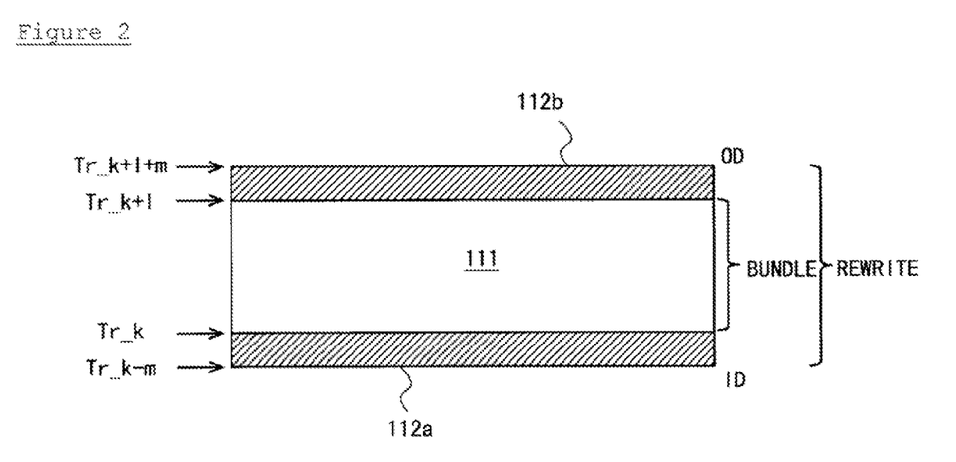
FIG. 2 schematically shows a rewrite region and a target region where the value of the degree of influence which corresponds to the rewrite region is added to the rewrite parameter in a preferred embodiment.

FIG. 2 schematically shows the rewrite region and the target region where the values of the degree of influence corresponding to the rewrite region are added, according to one embodiment. The lower side in FIG. 2 is the inner circumferential side, and the upper side is the outer circumferential side. Regions 111, 112a, 112b from data track Tr_k−m to data track Tr_k+l+m are the rewrite regions. Region 111 from data track Tr_k to data track Tr_k+l is the region where the values representing the affect on rewrite regions 111, 112a, 112b are added. Region 111 is formed from a plurality of data tracks and is a data track bundle.

The HDC/MPU 23 adds a value to the sum corresponding to a write to data track bundle 111 for each write to a data track in the data track bundle 111. When the sum reaches the specified threshold, the HDC/MPU 23 rewrites the data in the rewrite regions 111, 112a, 112b. As shown in FIG. 2, rewrite region 111 includes the adjacent regions 112a, 112b on both sides in addition to the data track bundle 111 where the write values are added. In FIG. 2, the adjacent regions 112a, 112b are comprised of the same number of data tracks, but these may be different depending on the structure of the HDD 1. This element is the same for the other structures below.

The memory region and the computation process needed in a rewrite process can be reduced by calculating the affect of a data write with a bundle of a plurality of data tracks as one unit and not calculating the affect of a data write for each data track. In addition, by including the adjacent regions on both sides in addition to the data track bundle in the rewrite region, data losses caused by a data write can be more reliably prevented. The present embodiment may be applied to a structure which calculates the affect of a write for each data track or a structure which rewrites only the data track bundle where the effect of a write is calculated. This feature is the same for the other structures below, in some approaches.

Figure 3:
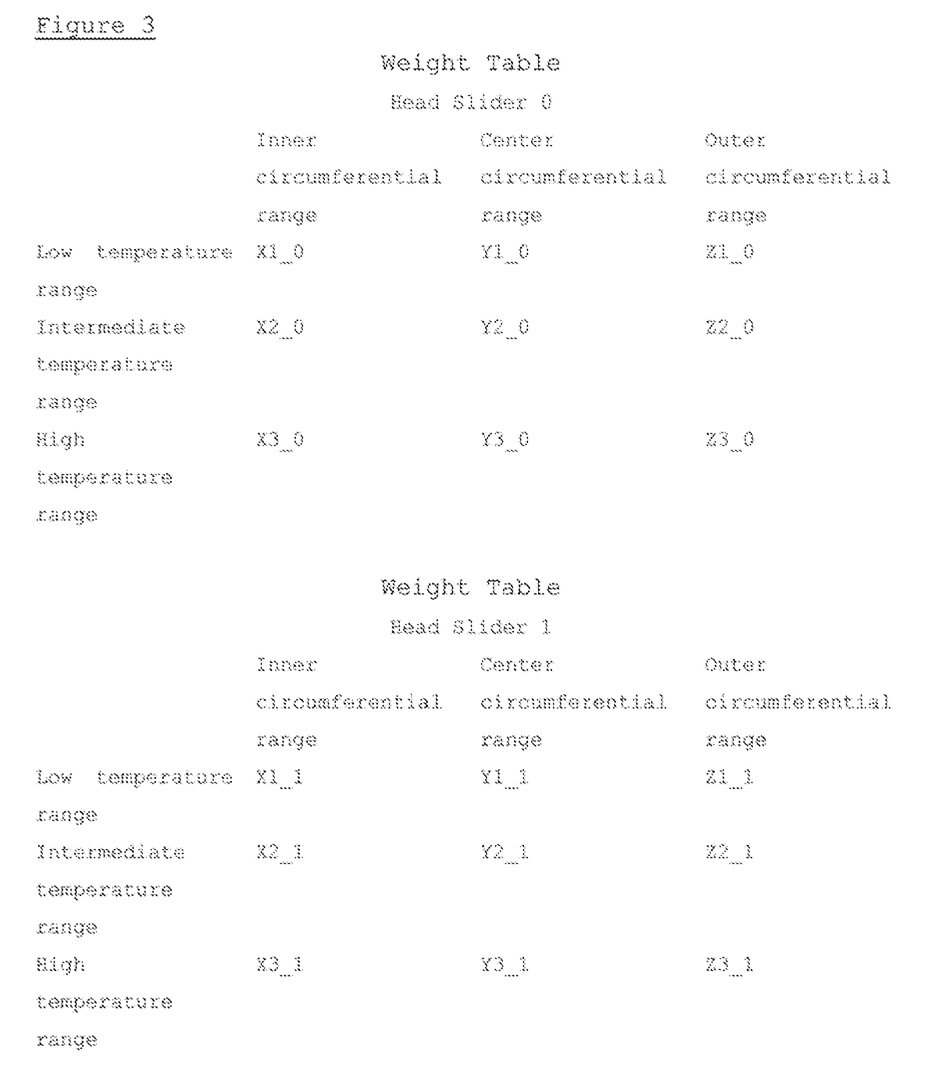
FIG. 3 schematically shows an example of one format of a value table for one embodiment when the values indicating the degree of influence of a data write are calculated.

The HDC/MPU 23 determines the positions of the head slider 12 (or disk recording surface) for writing data to the data track bundle 111 and above the recording surface of the data track bundle 111, and the values corresponding to the conditions when writing to the data track bundle 111. FIG. 3 schematically shows a format example of the table referenced by the HDC/MPU 23 when the values representing the degree of influence of the data write are calculated. Typically, the value tables are stored in the RAM 24 or the SRAM of the HDC/MPU 23. In the example in FIG. 3, HDD 1 has two head sliders 12 (one magnetic disk 11). A value table is prepared for each head slider 12. These two tables may be combined in one table.

In this example, the values reflecting the affect of a data write are specified by three elements (valued parameters). The recording surface is divided into the three regions of an inner circumferential region, a center circumferential region, and an outer circumferential region. The values are determined depending on whether the data track bundle 111 belongs to each region. In addition, as a preferred example of the write condition, the temperature during a write becomes one element specifying the values. HDC/MPU 23 acquires the detected temperature from a temperature sensor 17, references the value table, and determines the value.

For example, the data track bundle 111 exists in the center circumferential region of the recording surface accessed by head slider 0, and the detected temperature during a data write is in the low-temperature region. HDC/MPU 23 specifies the head slider of the data track bundle 111 and the radial position from the address specified by a command from the host 51, and specifies the drive temperature during a write from the detected temperature of the temperature sensor 17. HDC/MPU 23 references the value table, and determines Y1_0 corresponding to head slider 0, the center circumferential region, and low-temperature region as the value in this write.

HDC/MPU 23 has a counter for the data track bundle 111 (rewrite regions 111, 112a, 112b). Specifically, the counter is a variable in a program. HDC/MPU 23 changes the value of the counter by only the number corresponding to the determined value. For example, HDC/MPU 23 increments the counter by only the value. HDC/MPU 23 may increase the counter value by only the product of an increment unit and the value.

When the counter value reaches the specified threshold (at or above the threshold), HDC/MPU 23 rewrites the data of rewrite regions 111, 112a, 112b. HDC/MPU 23 may rewrite all of the data tracks of the rewrite regions 111, 112a, 112b in the one process, but preferably a portion of the data tracks is rewritten by following a process corresponding to commands from the host 51. Thus, the drop in performance of the HDD 1 can be suppressed.

As described above, the write conditions which specify the degree of influence (values of the influence) on adjacent data tracks by writes to a data track preferably includes the temperature. One reason is that the susceptibility to effects from the recording magnetic field of the magnetization state of the recording layer depends on the temperature. Another reason is that the operation of the HDD 1 is based on the temperature. For example, HDC/MPU 23 controls the recording magnetic field strength in response to the temperature detected by the temperature detector 17. By including the temperature in the basic elements in the value determination, the degree of influence can be reliably determined with few elements.

According to studies by the inventors, the effects on the adjacent data tracks of a data write in the high temperature range and the low temperature range are large compared to the effects in the intermediate temperature range. The main cause of this phenomenon is assumed to be changes in the recording magnetic field strength and the magnetization state of the recording layer due to the temperature. Thus, HDC/MPU 23 may use the recording current intensity as an element for determining the value instead of the temperature or in addition to the temperature.

HDD 1 may use a table which is the value table shown in Table 3 further subdivided. Specifically, the temperature may be divided into four or more temperature ranges, and the recording region may be divided into four or more regions. In the example in FIG. 3, the tables for the two head sliders 12 have nine entries, but the number of entries in the tables may differ depending on the head slider. In addition, a different degree of influence (value) for the adjacent regions because of a data write may be defined by a numerical formula. The division boundaries for the temperature and the recording regions may differ for each head slider. The entry values in the value table and the abovementioned division boundaries are determined in accordance with the test results in a testing process in the design and/or the manufacture of the HDD 1. These are the same in the other structures below.

In this structure, the degree of influence (value) due to a data write is preferably defined to correspond to the head slider and the radial position. However, HDD 1 may be constructed so that the degree of influence is determined only by the write conditions. As described above, the most preferred write condition is the temperature. For example, HDC/MPU 23 may determine the degree of influence by using only the temperature detected during a data write.

Figure 4:
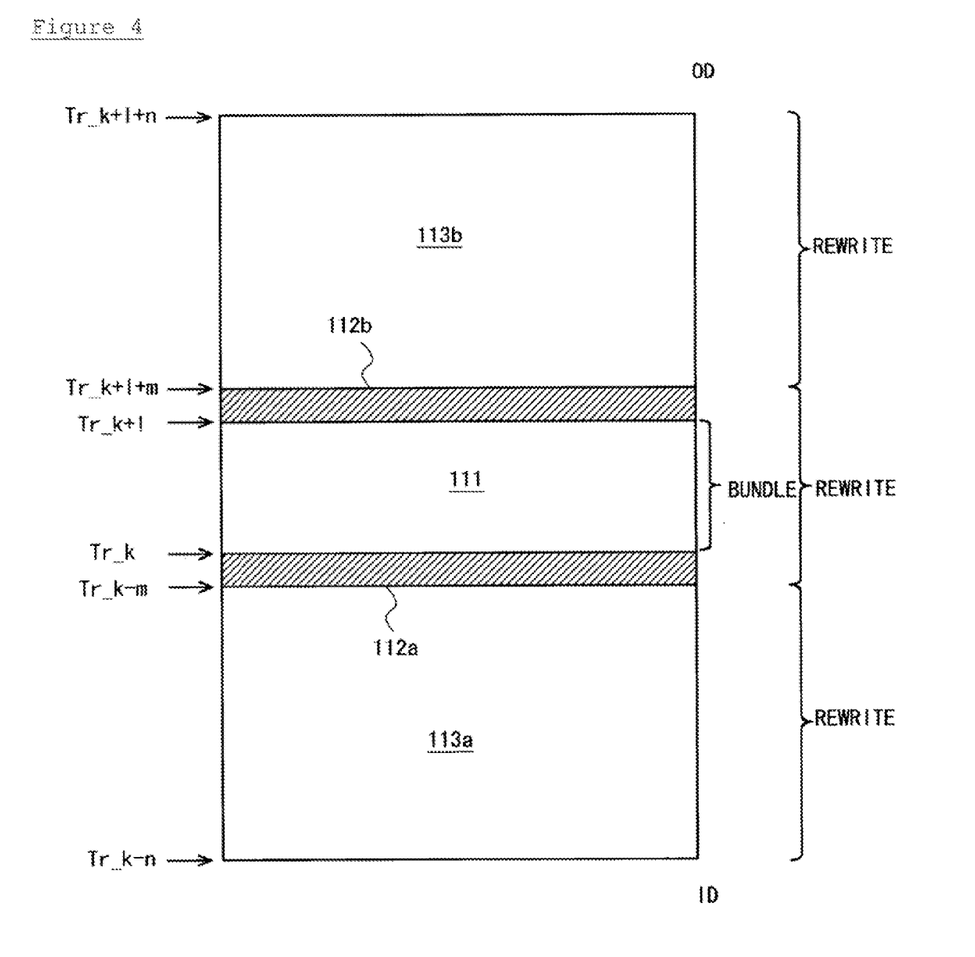
FIG. 4 schematically shows rewrite regions and target regions where the values of the degree of influence which corresponds to the rewrite regions are added, in one embodiment.

In the next preferred structure, the rewrite region is comprised of a plurality of sections. FIG. 4 schematically shows the rewrite region and the target region where the values of the degree of influence corresponding to the rewrite region are added. The lower side in FIG. 4 is the inner circumferential side, and the upper side is the outer circumferential side. The rewrite region includes region 113a and region 113b in addition to the regions 111, 112a, 112b described in FIG. 2. Region 113a is the region from data track Tr_k−n to data track Tr_k−m. Region 113b is the region from data track Tr k+l+m−n to data track Tr_k+l+n. Region 113a is on the inner circumferential side and adjacent to region 112a. Region 113b is on the outer circumferential side and adjacent to region 112b. The number of tracks in region 113a and region 113b is the same or different.

The region 111 from data track Tr_k to data track Tr_k+l is the region where the values representing the effect on rewrite regions 111, 112a, 112b, 113a, 113b are added. Region 111 is formed from a plurality of data tracks and is a bundle of data tracks. This feature is similar to the other preferred structures described above with reference to FIGS. 2 and 3.

In this structure, different values are assigned to first section 111, 112a, 112b and the second section 113a, 113b in the rewrite region. The reason is that the degree of influence due to a data write on the first section 111, 112a, 112b is different than the degree of influence on the second section 113a, 113b. In the structure of a typical HDD 1, the degree of influence due to a data write on the data track bundle (region) 111 is large for the nearby first section 111, 112a, 112b and small for the distant second section 113a, 113b. Consequently, a larger value is assigned for the effect on the first section 111, 112a, 112b than the second section 113a, 113b.

Figure 5:
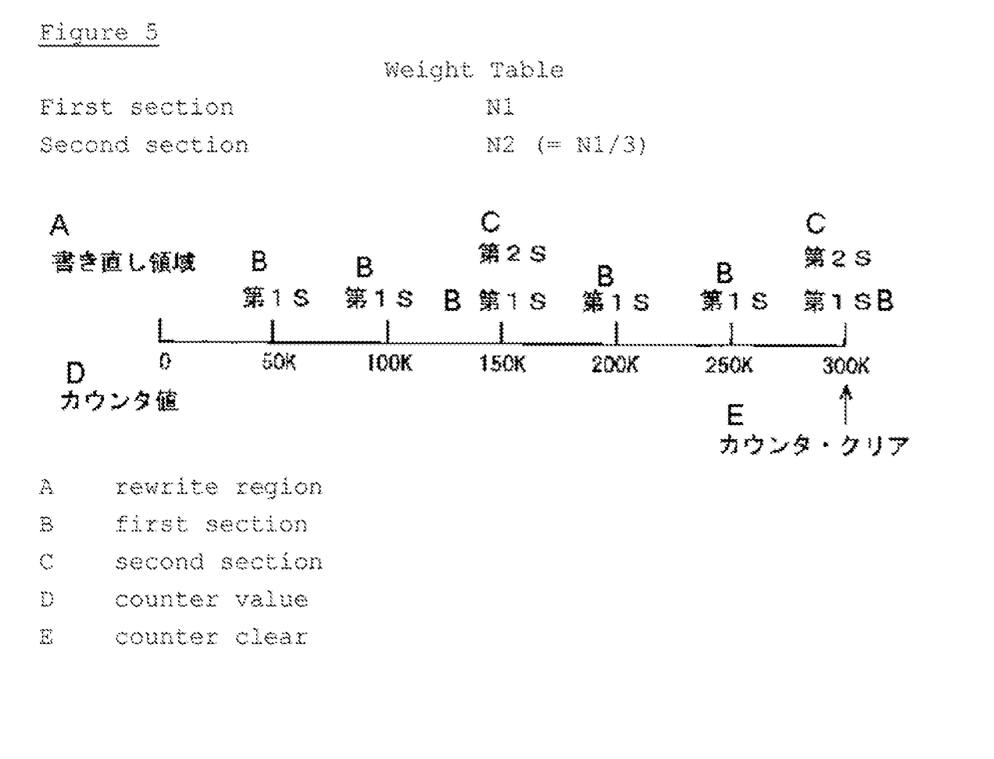
FIG. 5 schematically shows an example of a value table and an example of a counter of the number of data writes in one embodiment.

The top part of FIG. 5 is the value table defining the value of the first section 111, 112a, 112b and the value of the second section 113a, 113b. HDC/MPU 23 calculates the sum for each of the first section 111, 112a, 112b and the second section 113a, 113b. HDC/MPU 23 adds a value to the respective sum for each data write to the data track bundle 111. When the sum corresponding to the first section reaches the designated threshold, HDC/MPU 23 rewrites the first section 111, 112a, 112b. When the sum corresponding to the second section reaches the designated threshold, HDC/MPU 23 rewrites the second section 113a, 113b.

There are three methods for calculating the rewrite parameter. In one method, the thresholds for the first section and the second section are the same, and the value of one addition is different in the addition operations. In another method, the thresholds of the first section and the second section differ, and the value of one addition is the same in the calculations of the rewrite parameters. In the other method, the thresholds and the rewrite parameters are independent. For example, HDC/MPU 23 has the two rewrite parameters, one for the first section and one for the second section.

In the first method described above, the change in the rewrite parameter for each data write to the data track bundle 111 differs between the first rewrite parameter and the second rewrite parameter. The threshold for a data rewrite is the same in the first rewrite parameter and the second rewrite parameter. In the second method described above, the changes in the rewrite parameters are the same, and the thresholds differ. In the third method described above, the changes in the rewrite parameters and the thresholds differ. A large change means a large value. A small change means a small value. A large threshold means a small value. A small threshold means a large value.

When the same change (amount added) and different thresholds are used in the calculation of the rewrite parameters in the two sections, the rewrite parameters of the two sections can be calculated by one rewrite parameter. Thus, the sum calculation process can be more efficient. HDC/MPU 23 has one rewrite parameter and two thresholds. HDC/MPU 23 changes the value added to the rewrite parameter for each write to the data track bundle 111. When the rewrite parameter reaches the first threshold, HDC/MPU 23 rewrites one section, and rewrites the other section when the other threshold is reached.

The lower part of FIG. 5 shows an example of this type of structure. In this example, HDC/MPU 23 rewrites the first section 111, 112a, 112b each time the rewrite parameter reaches 50,000. HDC/MPU 23 rewrites the second section 113a, 113b each time the rewrite parameter reaches 150,000. The 150,000 count indicates rewrites of both the first section and the second section. When the rewrite parameter value reaches 300,000, HDC/MPU 23 clears the rewrite parameter. In this example, the value of the degree of influence due to data writes to the data track bundle 111 for the first section 111, 112a, 112b is three times that of the second section 113a, 113b.

In the example shown in FIG. 4, the regions 113a, 113b in the second section continue from the regions 112a, 112b in the first section. Depending on the structure of the HDD 1, the positions and the number of tracks in the regions 113a, 113b in the second section vary. The effect of data writes to regions 113a, 113b in the second section depend on the leakage magnetic field.

According to research by the inventors, the action of the leakage magnetic flux on the distant regions differs from the effect on the first section 111, 112a, 112b, which are the adjacent regions. The regions in the second section affected by the leakage magnetic flux are also regions separated from the regions in the first section. In HDD 1, for example, the example in FIG. 4 has a gap between the regions 113a, 113b in the second section and the regions 112a, 112b in the first section.

The regions affected by the leakage magnetic flux differ depending on the design of the HDD. Furthermore, variations are present even in HDDs having the same design. To improve the ease of design and reliability, preferably, the rewrite regions are wide. The first section and the second section are preferably connected, as in the example in FIG. 4. To avoid the effect on the performance by reducing the rewrite regions, the regions in the first section and the second section are preferably determined by measuring for each HDD, in some approaches.

Next, a structure combining the two preferred structures described above is explained, according to one embodiment. Namely, the rewrite region is comprised of a plurality of sections, and the degree of influence of a write changes depending on the write conditions. As the preferred example, the rewrite region is comprised of two sections (see FIG. 4), but is not so limited. Furthermore, a structure is described in which the HDC/MPU 23 determines the values based on the head slider, the radial position, and the temperature during a write (see FIG. 3), but more or less factors may be used in determining the values.

Figure 6:
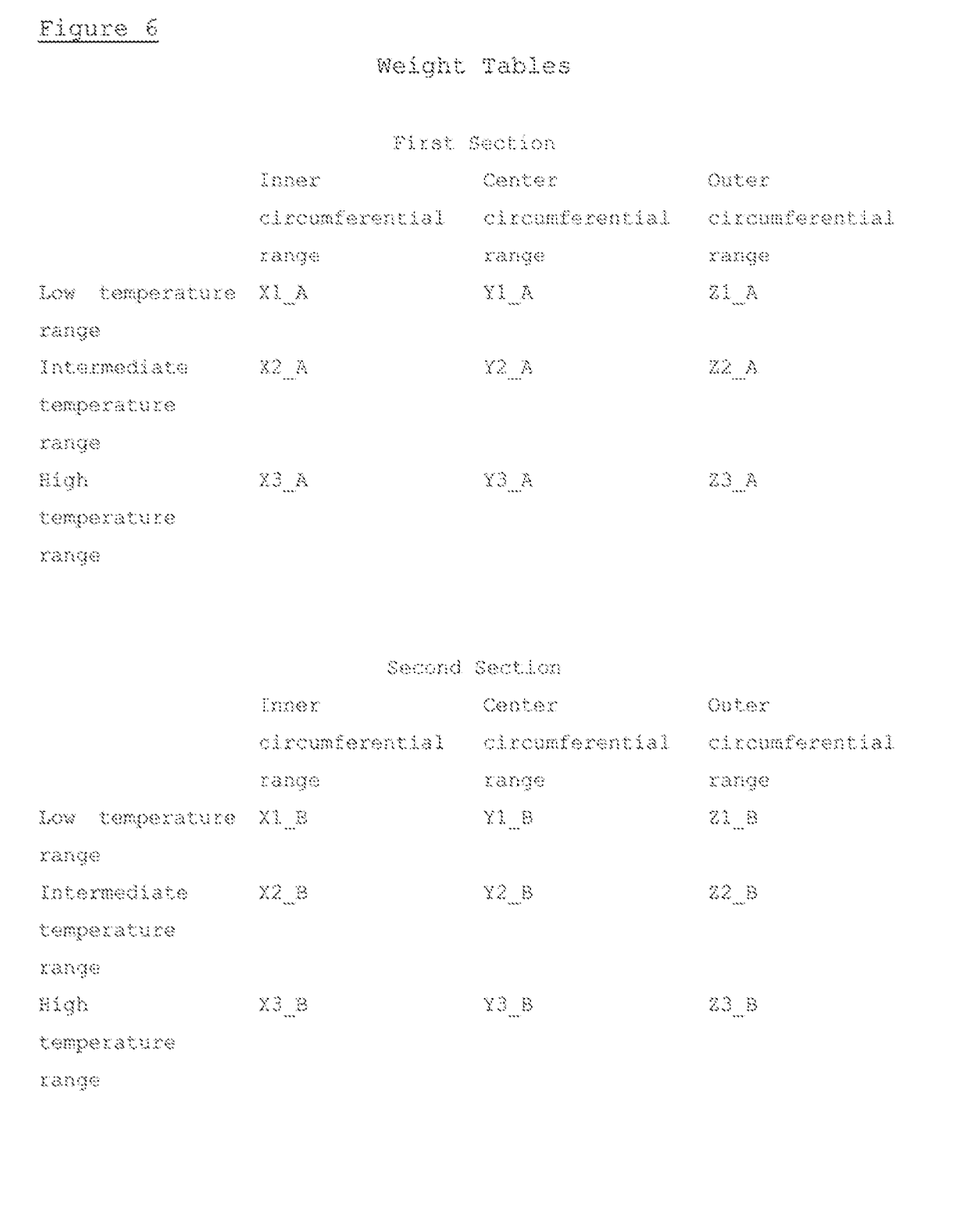
FIG. 6 schematically shows an example of the value table in one embodiment.

HDD 1 has independent tables which define the value corresponding to each of the first section and the second section. FIG. 6 shows an example of a value table corresponding to one head slider 12. A similar table is assigned to each head slider 12. The top table is the value table for the first section. The lower table is the value table for the second section. For convenience, the table is divided into two tables, but the information stored in the two tables can be stored in one table.

In this example, a table having similar divisions is defined for each section. Namely, the temperature is divided into the three temperature ranges of the low temperature range, the intermediate temperature range, and the high temperature range. The recording surface is divided into the three regions of the inner circumferential region, the center circumferential region, and the outer circumferential region. HDC/MPU 23 references these tables during a data write and calculates the respective rewrite parameter for the first and second sections of the rewrite regions corresponding to the written data track. The method for calculating the rewrite parameters is the same as the method for the other structures described above, in some approaches.

HDC/MPU 23 writes data to the address (data track) specified by the write command from the host 51. The HDC/MPU 23 references the specified address of the command (radial positions of the head slider and the write track), the temperature detected by the temperature sensor 17, and the value tables, and determines the respective value corresponding to the first section and the second section. Furthermore, HDC/MPU 23 calculates the respective rewrite parameter corresponding to the first section and the second section in the rewrite region corresponding to the track where data was written.

Thus, by dividing the rewrite region into a plurality of sections and defining the degree of influence (value) based on the write conditions for each section, the data rewrite process can be more appropriately controlled. Therefore, reducing the possibility of data losses caused by a data write (improvement in reliability) and maintaining the performance of the HDD can both be established, in preferred embodiments.

The degree of influence on adjacent regions of a data write increases with the elapse of the operating time. Consequently, when the effect on adjacent regions by one data write increases, preferably, HDC/MPU 23 updates the definition so that the value based on one write increases. One preferred index indicating the degree of influence is the error rate. The error rate is the number of errors per quantity of unit data and indicates the extent of data losses. For example, HDC/MPU 23 has an error correction circuit for correcting errors in the data which is read out. The number of error corrections by this circuit indicates the number of errors. Usually, an on-the-fly error correction circuit is implemented in the HDC/MPU 23. HDC/MPU 23 can acquire the number of error corrections (number of errors) from that circuit.

A concern is that constantly monitoring the error rate will have a negative effect on performance. When HDC/MPU 23 rewrites data, data are read out. The error correction process is conducted during this data read out. Consequently, HDC/MPU 23 preferably determines whether to change the values from the error rate (extent of data losses) measured during the data rewrite. Thus, a drop in performance by an error count can be avoided.

For example, HDC/MPU 23 counts the error rate of the rewrite region and updates the value definition (numerical value set in the table in the above examples) corresponding to the rewrite region when the error rate of that region exceeds a threshold. When the rewrite region is comprised of a plurality of sections, and a different value definition is assigned to each section, preferably, whether to update is determined for each section. The basis for determining whether a value adjustment is executed is not limited to this. For example, when the error rate of one data track in the rewrite region exceeds the threshold, the value definition corresponding to that rewrite region may be adjusted.

Figure 7:
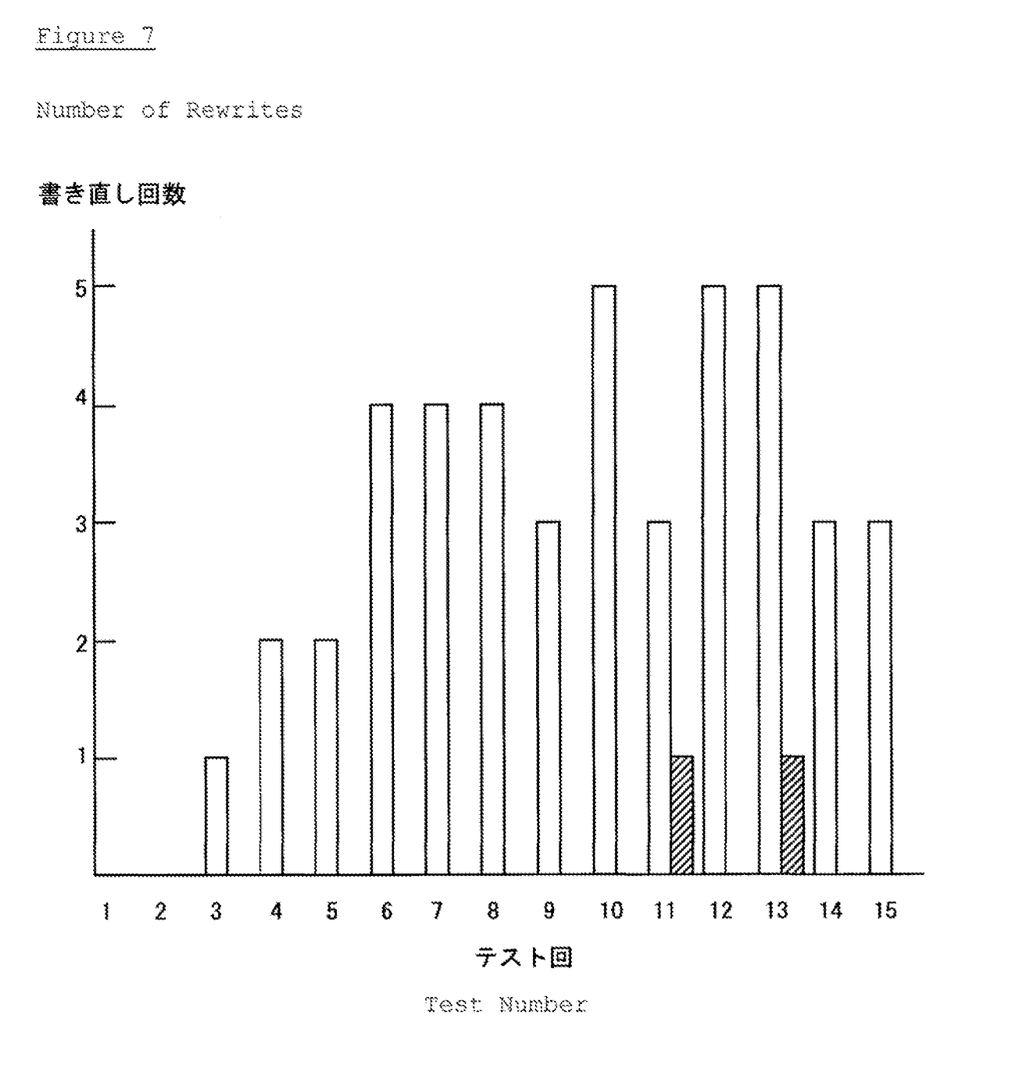
FIG. 7 shows the measurement results of the number of rewrites measured in an HDD according to one embodiment, and a conventional HDD.

Finally, FIG. 7 shows the measurement results of the HDD which used the data rewrite method, according to one embodiment. In the graph in FIG. 7, the X-axis indicates the number times the test of the HDD was repeated; and the Y-axis indicates the number of data rewrites. The test which repeatedly wrote and read data was conducted on a 4-head HDD. The test was conducted 15 times. The bar graph illustrates the number of data rewrites of the tests in order. The white bars are the measurement results of an HDD using a conventional method, and the black bars are the measurement results of an HDD in one embodiment.

As shown in FIG. 7, in a conventional HDD, the first data rewrite occurred in the third test. On the other hand, the HDD, according to one embodiment, had the first rewrite in the eleventh test. The total of rewrites based on 15 tests was 44 times for the conventional HDD and 2 for the HDD using methods disclosed herein. This measurement data clearly shows that the methods disclosed herein significantly reduce the number of rewrites of adjacent data tracks caused by repeated data writes.

The present invention was described above with preferred embodiments as the examples, but the present invention is not limited to the above embodiments. A person skilled in the art can easily modify, add, and transform each element of the above embodiments within the scope of the present invention. For example, the control in this mode can be applied to a magnetic disk drive other than an HDD.

What is claimed is:

1. A magnetic disk drive, comprising:
 a magnetic disk having a plurality of data tracks;
 a magnetic head for accessing the magnetic disk;
 a motion mechanism for moving the magnetic head in a radial direction above the magnetic disk; and
 a controller electronically coupled to the magnetic head,
 wherein the controller is configured to add a value to a rewrite parameter for a rewrite region based on a number of writes to one or more of the plurality of data tracks related to the rewrite region,
 wherein the value is chosen from a plurality of values which reflect a degree of influence the number of writes have on the rewrite region, and
 wherein the controller is configured to cause the magnetic head to rewrite data of the rewrite region when the rewrite parameter is greater than a threshold.

2. The magnetic disk drive of claim 1, wherein the plurality of values are defined based on write conditions during a write to one or more of the plurality of data tracks.

3. The magnetic disk drive of claim 2, wherein the write conditions include a temperature during the write to one or more of the plurality of data tracks.

4. The magnetic disk drive of claim 1, wherein the plurality of values vary based on a radial position of the data track on the magnetic disk.

5. The magnetic disk drive of claim 1, wherein a plurality of magnetic heads are mounted, and wherein a plurality of values are defined for each of the plurality of magnetic heads.

6. The magnetic disk drive of claim 1, wherein the rewrite region comprises a plurality of sections, and wherein a plurality of values are defined for each of the plurality of sections.

7. The magnetic disk drive of claim 6, wherein the rewrite region comprises two sections, and wherein one of the two sections includes regions further from one or more of the plurality of data tracks than another of the two sections.

8. The magnetic disk drive of claim 7, wherein the controller calculates one rewrite parameter for the two sections, and wherein a different threshold for rewriting is used for each of the two sections.

9. The magnetic disk drive of claim 2, wherein the controller updates definitions of the plurality of values.

10. The magnetic disk drive of claim 9, wherein the controller uses error rates in the rewrite region to determine whether to update the definitions of the plurality of values.

11. The magnetic disk drive of claim 1, wherein the rewrite parameter is reset after the magnetic head rewrites data of the rewrite region.

12. A method for rewriting data on a magnetic disk in a magnetic disk drive, the method comprising:
 writing one or more of a plurality of data tracks in a rewrite region;
 defining a plurality of values, each value reflecting a degree of influence the writing the one or more of a plurality of data tracks has on the rewrite region;
 adding one of the plurality of values to a rewrite parameter for the rewrite region upon the writing data to one or more of the plurality of data tracks;
 determining that the rewrite parameter for the rewrite region has reached or exceeded a threshold; and
 rewriting data in the rewrite region when the rewrite parameter is greater than or equal to the threshold.

13. The method of claim 12, wherein the plurality of values are defined based on writing conditions during the writing to one or more of the plurality of data tracks.

14. The method of claim 13, wherein the write conditions include a temperature during the writing.

15. The method of claim 12, wherein, the plurality of values vary in response to a radial position of one of the plurality of data tracks on a magnetic disk.

16. The method of claim 12, wherein the rewrite region comprises a plurality of sections, and wherein a plurality of values are defined for each of the plurality of sections.

17. The method of claim 16, wherein the rewrite region comprises two sections, and wherein one of the two sections includes regions further from one or more of the plurality of data tracks than another of the two sections.

18. The method of claim 17, wherein one rewrite parameter is calculated for writes to the two sections, and wherein a different threshold for rewriting is used for each of the two sections.

19. The method of claim 12, wherein definitions of the plurality of values are updated.

20. The method of claim 19, wherein an error rate in the rewrite region is used to determine whether to update the definitions of the plurality of values.

21. The method of claim 12, wherein the magnetic disk drive includes a plurality of magnetic heads, and wherein a plurality of values are defined for each of the plurality of magnetic heads.

22. The method of claim 12, further comprising resetting the rewrite parameter after rewriting data in the rewrite region.

* * * * *

UNITED STATES PATENT AND TRADEMARK OFFICE
CERTIFICATE OF CORRECTION

PATENT NO.        : 9,142,252 B2
APPLICATION NO.   : 12/822130
DATED             : September 22, 2015
INVENTOR(S)       : Toru Aida et al.

Page 1 of 1

It is certified that error appears in the above-identified patent and that said Letters Patent is hereby corrected as shown below:

In the specification:

col. 1, line 27 replace "in" with --In--.

Signed and Sealed this
Twenty-second Day of March, 2016

Michelle K. Lee
*Director of the United States Patent and Trademark Office*